United States Patent [19]
Alfred et al.

[11] 3,938,651
[45] Feb. 17, 1976

[54] SELF-SUPPORTING SPIRAL CONVEYOR

[75] Inventors: P. Allan Alfred, Hittarp; Sven-Olle H. Rothstein, Raa; Stig Vilhelm Popoff, Landskrona, all of Sweden

[73] Assignee: Frigoscandia Contracting AB, Helsingborg, Sweden

[22] Filed: Mar. 1, 1974

[21] Appl. No.: 447,375

[30] Foreign Application Priority Data
Mar. 7, 1973 Sweden.............................. 7303179

[52] U.S. Cl.................... 198/136; 34/147; 198/203
[51] Int. Cl.² ........................................ B65G 15/00
[58] Field of Search ....... 198/136, 196, 203; 34/147

[56] References Cited
UNITED STATES PATENTS

| | | | |
|---|---|---|---|
| 2,751,064 | 6/1956 | Russell | 198/136 X |
| 3,500,989 | 3/1970 | Cripe et al. | 198/203 X |
| 3,612,252 | 10/1971 | Yu | 198/203 X |
| 3,659,697 | 5/1972 | Brackmann | 198/136 |

*Primary Examiner*—Evon C. Blunk
*Assistant Examiner*—Douglas D. Watts
*Attorney, Agent, or Firm*—Karl W. Flocks

[57] ABSTRACT

In a conveying device with an endless conveyor belt, for the conveyance of products, the conveyor belt is adapted, over a part of its length, to follow a path comprising a number of superimposed, helically extending belt tiers. To this end, the conveyor belt comprises mutually articulated and interadjustable link means consisting of a bottom part and links disposed at the ends thereof and forming the two sides of the belt. The links on the two sides of the endless conveyor belt are formed as spacers whose upper edge portions are adapted to bear against the lower edge portions of the links, likewise formed as spacers, disposed on the two sides of the overlying tier of the endless conveyor belt in order that such an overlying belt tier be supported by the immediately underlying tier of the conveyor belt.

9 Claims, 8 Drawing Figures

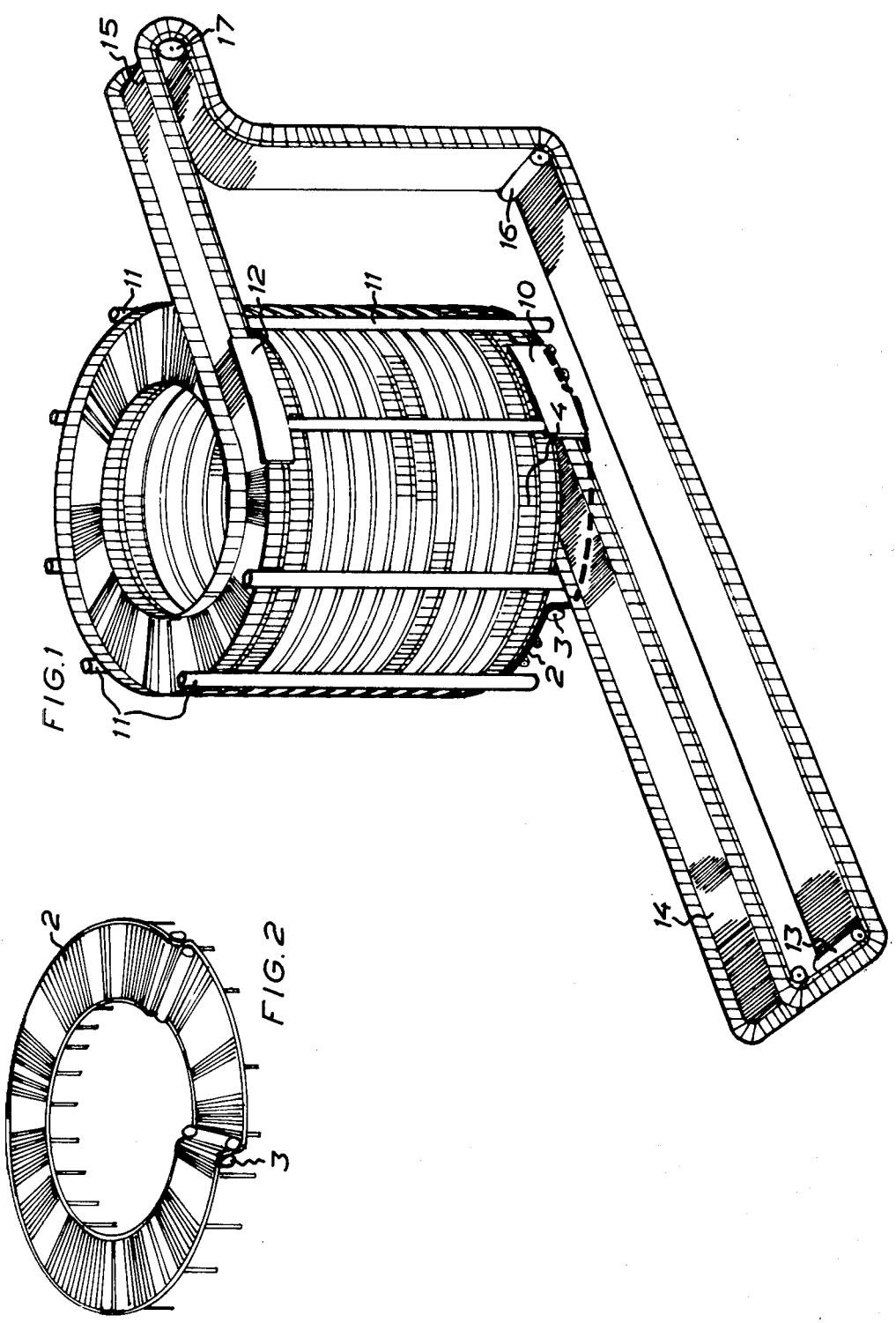

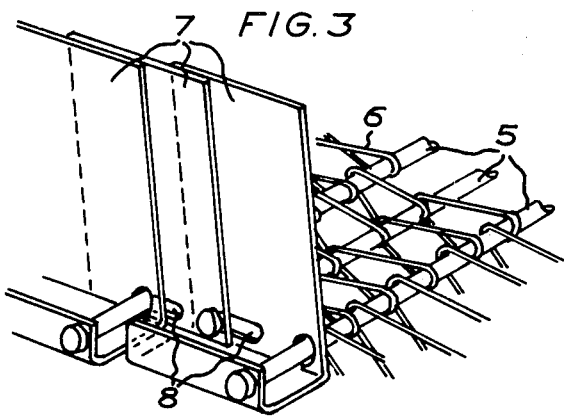
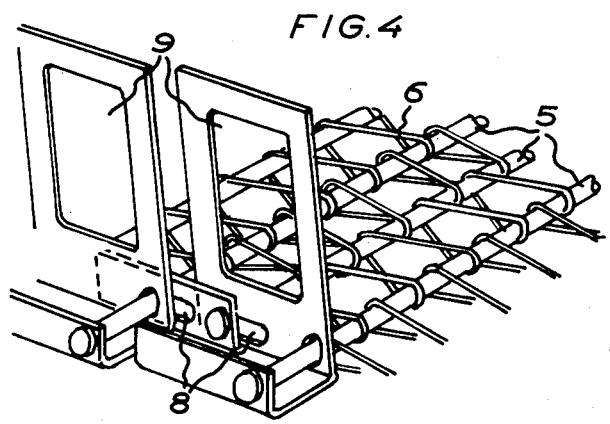

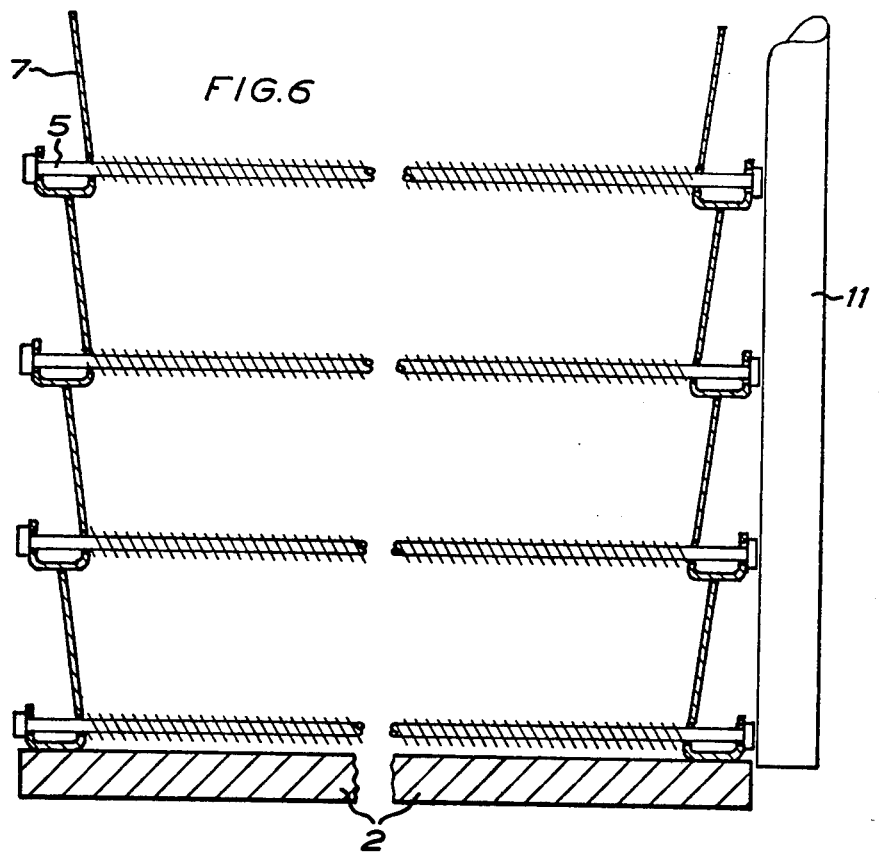
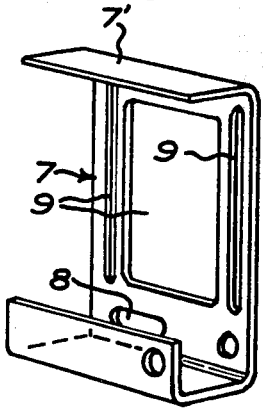
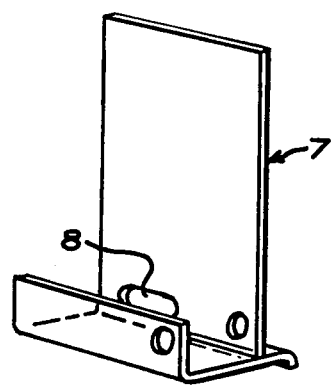
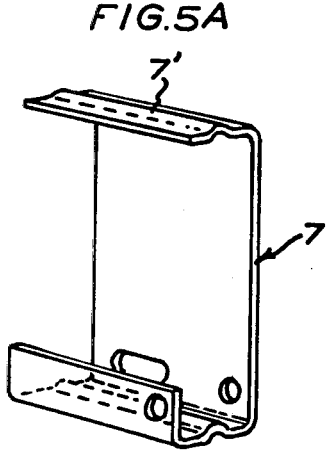

SELF-SUPPORTING SPIRAL CONVEYOR

The present invention relates to a conveying device with an endless conveyor belt for the conveyance of products in which device a portion of the length of said conveyor belt is arranged to follow a path consisting of a number of superimposed, helically extending tiers, said conveyor belt comprising mutually articulated and interadjustable link means including a bottom part and, disposed at the ends thereof, links forming the two sides of the conveyor belt.

According to the invention, the links on either side of the endless conveyor belt are formed as spacers whose upper edge portions are arranged to bear against the lower edge portions of the links forming such spacers on either side of the overlying tier of the endless conveyor belt, in order that such an overlying belt tier be supported by the immediately underlying tier of the conveyor belt. Thus, the invention has made it possible, in a proper sense, to provide a self-supporting belt pile in a conveying device including an endless conveyor belt, which means that the belt pile need not be supported by or rest against drums, guide strips or like members, as is the case in prior-art conveying devices of this type. Consequently, the invention permits a considerably simplified construction by eliminating a number of otherwise associated details.

According to a preferred embodiment, the superimposed, helically extending belt tiers, spaced apart by the links disposed along either side of the belt and forming spacers, are arranged to be carried by a support means disposed underneath said tiers and having substantially the same pitch as said tiers. Said support means permits belt tiers to be readily fed into the pile continuously.

An important feature of the conveying device is that the bottom parts of the link means are perforated, whereas the links disposed along either side of the conveyor belt and forming spacers, are substantially nonperforated, so that the spacers of the superimposed belt tiers form a vertical channel for a treating medium. At the same time as the belt advances the product to be treated with a flowing medium, within the space of the belt pile, the spacers at the edges of the belt thus form a practically stationary channel for the treating medium.

The primary object of the conveying device according to the invention is to convey products of various kinds through a confined space for a certain amount of time, during which the products are treated, for instance by heating, drying, cooling, freezing etc. The conveying device is particularly suited for food products, since it satisfies rigorous hygiene requirements by not having a belt-supporting frame construction, where food-leavings and the like can gather developing bacteria and also by the fact that the parts in contact with the products, can be washed continuously during the operation of the device.

The invention will be more fully described with reference to the accompanying drawings which by way of example illustrate a preferred embodiment of the conveying device according to the ivention, and different embodiments of the links of the conveying device.

In the drawings:

FIG. 1 is a perspective view of the entire conveying device;

FIG. 2 is a perspective view of the support means of the conveying device;

FIGS. 3 and 4 show a part of the conveyor belt with different embodiments of the links;

FIG. 5 A, B and C, show three further embodiments of the links;

FIG. 6 is a cross-sectional view of four superimposed belt tiers carried by the support means.

The conveying device comprises the conveyor belt 4 which is intended for the conveyance of products and a portion of the length of which is arranged to follow a path consisting of a number of superimposed, helically extending tiers. Said conveyor belt 4 comprises mutually articulated and interadjustable link means, including a bottom part 5 and, disposed at the ends thereof, links 7, forming the two sides of the belt 4. In the embodiment illustrated, the bottom part 5 comprises transverse connecting elements for the links 7, and said connecting elements may be clothed with wire 6, netting or like surface-forming material, to serve as a supporting plane. The relative adjustment of the link means is permitted by the elongated holes 8, which are formed in the links 7 and intended to receive the end portions of the connecting elements.

The links 7, disposed on either side of the endless conveyor belt 4, are designed as spacers which are arranged to bear with their upper edge portions against the lower edge portions of the links 7 forming such spacing means on either side of the overlying tier of the endless conveyor belt 4 in order that such an overlying belt tier be supported by the immediately underlying tier of the conveyor belt.

The superimposed, helically extending belt tiers which are spaced apart by the links 7, disposed along either side of the belt and forming spacers, are arranged to be carried by a support means 1 disposed underneath said tiers and having substantially the same pitch as said tiers, so that such belt tiers can be readily fed into the pile one after the other.

The conveying device is, of course, provided with a drive for the endless conveyor belt 4. It is advantageous to provide such a drive in conjunction with the support means, said drive comprising, in the illustrated embodiment, a second endless conveyor belt 2 disposed on said support means 1 and engaging the lowermost belt tier. Motors 3 are provided for driving the belt 2. As will appear most clearly from FIG. 2, the conveyor belt 2 disposed on the support means 1, is run in such a manner that a lateral opening is formed between the highest and the lowest points of the belt 2.

In another embodiment, the drive can be a driven roller-way, or a tooth-wheel drive, the cogs of which are arranged to engage with the connecting elements in the bottom part 5.

In the embodiment illustrated, the support means 1 of the belt tiers is in the form of an arc, but may also be an elliptic curve. The shape of the support means 1 determines the shape of the superimposed belt tiers.

In the embodiment of FIGS. 3 and 5 A and B, the links 7, disposed along either side of the conveyor belt 4 and forming spacers, shall be at least substantially non-perforated, whereas the bottom parts 5 of said links shall be perforated. Thus, the spacers 7 of the superimposed belt tiers will form a vertical channel for a treating medium. In another embodiment, as seen in FIGS. 4 and 5 C, the links disposed along either side of the conveyor belt 4 and forming spacers, shall be perforated to permit a treating medium to flow in the transverse direction of the belt 4. Such a perforation of the links is achieved by the recesses 9. In this case, the material of the bottom parts 5 can be either tight or perforated.

As shown in FIGS. 3, 4 and 6, the links 7 have somewhat outwardly inclined upper wall portions and are formed with bent lower portions through which latter portions extend the connecting elements. The undersides of the bent lower portions are intended to bear against the upper edges of the outwardly inclining wall portions of the links 7 in the underlying belt tier.

In FIGS. 5 A and C, the links 7 are provided at their upper ends with inwardly bent portions 7', forming supporting surfaces for the overlying links. To improve the guidance between superimposed links or belt tiers, said portion 7' can be formed with a ridge, while the downwardly facing side of the link can have a mating groove, which will thus travel on and be guided by said ridge.

In FIG. 5 B, the portion forming the side wall is a separate vertical metal sheet, welded to the lower portion of the link 7, which lower portion can have a thickness different from that of said vertical sheet.

As can be seen from FIG. 1, the conveying device is provided at the belt pile with a helix-forming guide 10, helix support means 11 and helix-straightening guides 12. The guide 10 is devised to bend the straight conveyor belt 4 according to the desired helix radius, whereas the guides 12 are devised to straighten out the belt when leaving the pile. The helix support means 11, comprising support rollers, are provided either on the outside or on the inside of the belt pile. Said means serve merely as a safety device for the belt pile and should not abut the pile in the normal operation of the conveying device. Thus, the helix support means 11 are not a compulsory feature of the invention.

The belt 4 is provided with belt-stretching means 13.

14 designates the loading station of the device, while 15 designates the unloading station thereof. 16 and 17 are guide rollers for the conveyor belt 4, which may be drive rollers and, thus, serve as auxiliary drives for the conveyor belt 4 outside the belt pile.

The conveying device, as shown in FIG. 1, operates as follows.

The motors 3 drive the roller-way or support belt 2 counter-clockwise in FIG. 1. This motion is transferred by friction to the conveyor belt 4, whereby the entire belt pile is turned, correspondingly, counter-clockwise. Being supplied to the belt helix from the left, a new portion of conveyor belt is guided into position therein by the helix-forming guide 10, to be laterally held in position and start forming the helix. This is of importance, since the belt, once introduced into the helix, is to take up the pressure of the overlying belt tiers. At the loading station 14, products are fed onto the belt.

The products can be either in bulk or packed, their height being determined by that of the spacers 7. The products are conveyed by the belt to follow its helical movement up through the pile, where they are subjected to the desired treatment. At the discharge end of the pile, the helix-straightening guides 12 actuate the belt pile, so that the uppermost belt tier thereof is directed straight out from the pile. At the unloading station 15, the products leave the belt, which, itself, is then guided via the rollers 16 and 17 through the loading station 14 to be fed into the belt helix again.

In case the conveyor belt is used for bulk products, a belt-washing device (not shown) can be inserted between the unloading and loading stations, whereby the entire belt can be cleaned. A washing station can also be arranged for the roller-way or support belt 2.

As described in the example, the belt can be advanced counter-clockwise and upwardly in a circular path, but this advance can also be clockwise and/or downwardly, or in an oval path or different combinations thereof.

The invention is not restricted to what has been described above and shown in the drawings, but may be modified within the spirit and scope of the following claims.

What we claim and desire to secure by Letters Patent is:

1. A conveying device with an endless conveyor belt for the conveyance of products, in which device a portion of the length of said conveyor belt is arranged to follow a path consisting of a number of superimposed, helically extending tiers, said conveyor belt comprising mutually articulated and interadjustable link means and a bottom part and, disposed at the ends of said bottom part, said link means including links forming the two sides of the conveyor belt, wherein said links on either side of said endless conveyor belt are articulated and interadjustable and are formed as spacers whose upper edge portions are arranged to bear against lower transverse edge portions of said links forming such spacers on either side of the overlying tier of said endless conveyor belt, in order that such an overlying belt tier be supported by the immediately underlying tier of said conveyor belt.

2. A conveying device as claimed in claim 1, wherein a support means disposed underneath said tiers and having substantially the same pitch as said belt tiers carries said superimposed, helically extending belt tiers which are spaced apart by the links disposed along either side of the belt and forming spacing means.

3. A conveying device as claimed in claim 2, wherein said support means of the belt tiers comprises a drive for the endless conveyor belt.

4. A conveying device as claimed in claim 3, wherein said drive for the endless conveyor belt comprises, disposed on said support means, a second endless conveyor belt engaging the lowermost belt tier.

5. A conveying device as claimed in claim 4, wherein said second endless conveyor belt disposed on said support means is run in such a manner that a lateral opening is formed between the highest and the lowest points of the said second belt.

6. A conveying device as claimed in claim 2, wherein said support means of the belt tiers is in the form of an arc.

7. A conveying device as claimed in claim 2, wherein said support means of the belt tiers is in the form of an elliptic curve.

8. A conveying device as claimed in claim 1, wherein said bottom parts are perforated, whereas the links disposed along either side of the conveyor belt and forming spacers, are substantially non-perforated so that the spacers of the superimposed belt tiers form a vertical channel for a treating medium.

9. A conveying device as claimed in claim 1, wherein the links disposed along either side of the conveyor belt and forming spacers, are perforated to permit a treating medium to flow in the transverse direction of the belt.

* * * * *